B. W. PATTINSON.
MOVABLE HEADLIGHT.
APPLICATION FILED FEB. 26, 1917.
1,250,000.
Patented Dec. 11, 1917.
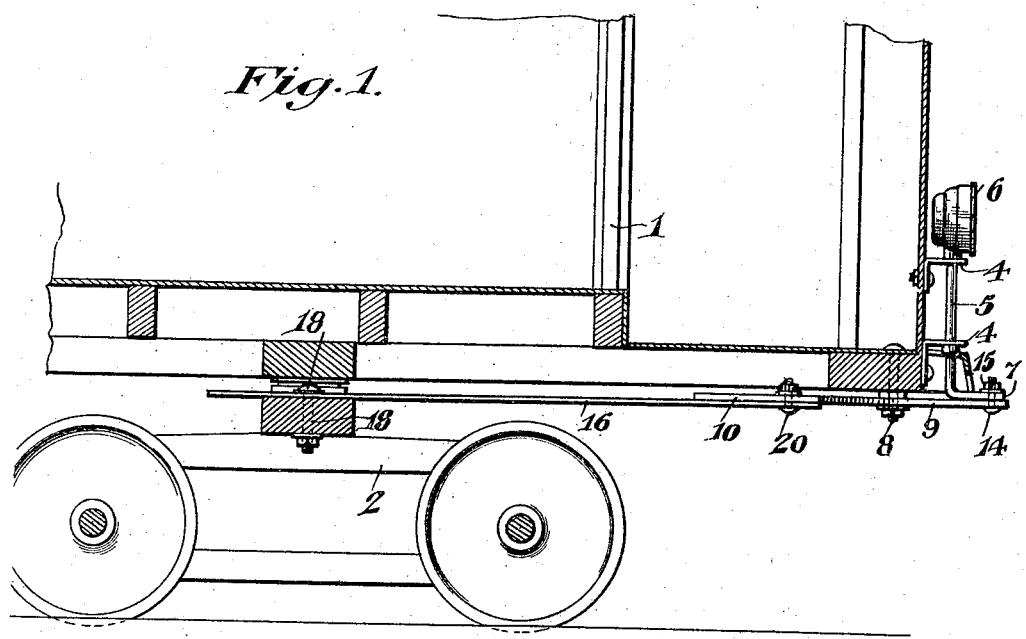
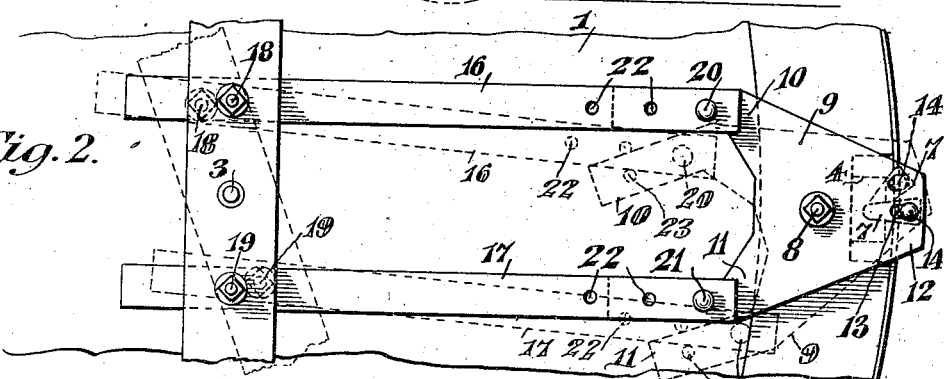
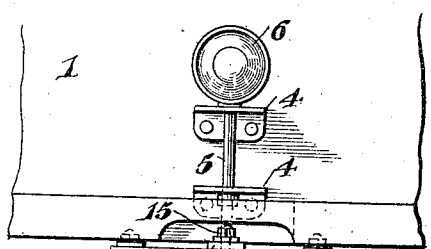
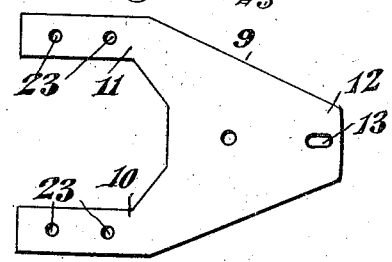
WITNESSES
Jas. K. McCathran
Chas. H. Kesler
INVENTOR
Benjamin W. Pattinson
BY
ATTORNEY

UNITED STATES PATENT OFFICE.

BENJAMIN W. PATTINSON, OF MANITOU, COLORADO.

MOVABLE HEADLIGHT.

1,250,000. Specification of Letters Patent. Patented Dec. 11, 1917.

Application filed February 26, 1917. Serial No. 150,983.

*To all whom it may concern:*

Be it known that I, BENJAMIN W. PATTINSON, a citizen of the United States, residing at Manitou, in the county of El Paso and State of Colorado, have invented a new and useful Movable Headlight, of which the following is a specification.

This invention relates to movable headlights for vehicles such as street cars, locomotives, automobiles, and the like.

The object of the invention is to provide a construction whereby a steady and firm movement of the headlight is insured when the truck moves to change the course of a vehicle.

The actuating mechanism connecting the truck with the headlight is simple in its construction and comprises a minimum of parts which cannot be easily disarranged or broken.

In the accompanying drawing I have illustrated one embodiment of my invention, in which:

Figure 1 is a side elevation of my device, showing the same applied to a car, parts of the latter being in section.

Fig. 2 is a bottom plan view of the same, looking upwardly.

Fig. 3 is a front elevation.

Fig. 4 is a detail plan view of a three-armed lever or plate used in my device.

In the embodiment of the invention here shown, the car 1 is provided with a truck 2 pivoted to the same by means of a king bolt 3. At the front the car is provided with vertically spaced brackets 4 in which is journaled a vertical shaft 5, having fixed thereto at its upper end the headlight 6, and at its lower end a forwardly extending horizontal crank arm 7.

Pivoted beneath the car by means of a pivot bolt 8 and slightly to the rear of the shaft 5 is a horizontally arranged three-armed lever or plate 9 comprising rearwardly extending lateral arms 10 and 11 behind the pivot bolt 8 and a forwardly extending central arm 12 arranged in front of the pivot bolt and extending beneath the crank arm 7. The arm 12 is pivotally and slidably connected to the end of the crank arm by means of a longitudinally extending slot 13 on the arm 12 and a bolt or pin 14 mounted on the crank arm, riding in the slot and retained in position by means of a nut 15. I do not desire, however, to limit myself to the means here illustrated for connecting the arm 7 to the lever 9, as any loose connection may be used instead of the pin and slot.

A pair of parallel links or connecting rods 16 and 17 are pivotally connected at their rear ends by means of the vertical pivot bolts 18 and 19 to the truck 2 at each side of the king bolt 3. The forward ends of these connecting rods are pivotally connected by means of similar bolts 20 and 21 to the arms 10 and 11, respectively.

When the car is traveling in a straight line, the headlight 6 will be directed straight forwardly and the bolt 14 will be in alinement with the bolts 3 and 8. However, as the truck swings about the king bolt, as illustrated by dotted lines in Fig. 2, the lever 9 will swing in the same direction by reason of the connecting rods 16 and 17, and the arm 12 of the lever will swing the headlight in the same direction of rotation as the truck by reason of the pin and slot connection between the crank arm 7 and the arm 12.

In order to accommodate my device to cars of various lengths and proportions, the links 16 and 17 and the arms 10 and 11 of the lever 9 are provided with holes 22 and 23 whereby they may be adjustably connected by means of the pivot bolts 20 and 21.

While I have shown and described one embodiment of my invention, it is to be understood that I do not desire to be limited to the details of construction herein shown and described, for obvious modifications will be apparent to anyone skilled in the art.

What is claimed is:—

The combination with a vehicle having a truck pivoted thereto, of a head lamp having a stem journaled at the front end of the vehicle, the lower end of the stem being bent forwardly to provide a crank arm, a three-armed lever centrally pivoted to the bottom of the vehicle, one of the arms of the lever being projected forwardly beneath the crank arm, and having an elongated slot, a pivot engaged in the slot and fastened in the crank arm, while the other arms of said lever extend rearwardly in spaced parallel relation to each other, each being formed with a plurality of holes, and a pair of links adjustably and pivotally connected at their forward ends to the parallel arms of the lever through the holes therein and at their rear ends to said truck at opposite sides of the pivotal axis thereof.

In testimony, that I claim the foregoing as my own, I have hereto affixed my signature in the presence of two witnesses.

BENJAMIN W. PATTINSON.

Witnesses:
J. FRANK CAMPBELL,
CHARLES MEADOR.

Copies of this patent may be obtained for five cents each, by addressing the "Commissioner of Patents, Washington, D. C."